United States Patent
Zylla

[19]
[11] Patent Number: 6,132,098
[45] Date of Patent: Oct. 17, 2000

[54] FOUR-RING ECCENTRIC BEARING FOR PRINTING-MACHINE CYLINDERS

[75] Inventor: Josef Zylla, Schonungen, Germany

[73] Assignee: FAG OEM und Handel AG, Germany

[21] Appl. No.: 09/331,678

[22] PCT Filed: Oct. 17, 1998

[86] PCT No.: PCT/DE98/03044

§ 371 Date: Jun. 24, 1999

§ 102(e) Date: Jun. 24, 1999

[87] PCT Pub. No.: WO99/21717

PCT Pub. Date: May 6, 1999

[30] Foreign Application Priority Data

Oct. 24, 1997 [DE] Germany .......................... 197 46 987

[51] Int. Cl.⁷ .............................. F16C 19/08; F16C 23/10
[52] U.S. Cl. ........................................... 384/461; 384/447
[58] Field of Search .................................. 384/447, 461, 384/571

[56] References Cited

U.S. PATENT DOCUMENTS

| | | | |
|---|---|---|---|
| 4,834,560 | 5/1989 | Jacob et al. ........................ | 384/461 |
| 5,234,270 | 8/1993 | Mathes ............................... | 384/461 |
| 5,632,560 | 5/1997 | Dittenhofer ........................ | 384/447 |

FOREIGN PATENT DOCUMENTS

| | | |
|---|---|---|
| 0694384 | 1/1996 | European Pat. Off. . |
| 1400319 | 10/1968 | Germany . |
| 1525140 | 6/1969 | Germany . |
| 3324811 | 1/1985 | Germany . |

*Primary Examiner*—Thomas R. Hannon
*Attorney, Agent, or Firm*—Ostrolenk, Faber, Gerb & Soffen, LLP

[57] ABSTRACT

In order to achieve precise adjustment of cylinders with a four-ring eccentric bearing for printing-machine cylinders under favorable conditions of oscillation and rotation, roller bodies (8, 9, 10) are provided between the three pairs of surfaces (5, 6, 7), which can twist with respect to one another, whereby two double-row cylindrical roller bearings (8, 9) and, as the innermost bearing, a double-row cylindrical roller bearing (10) or needle bearing is provided externally on the side of the moving bearing, and three double-row ball bearings (15, 16, 17) are provided on the side of the fixed bearing.

5 Claims, 1 Drawing Sheet

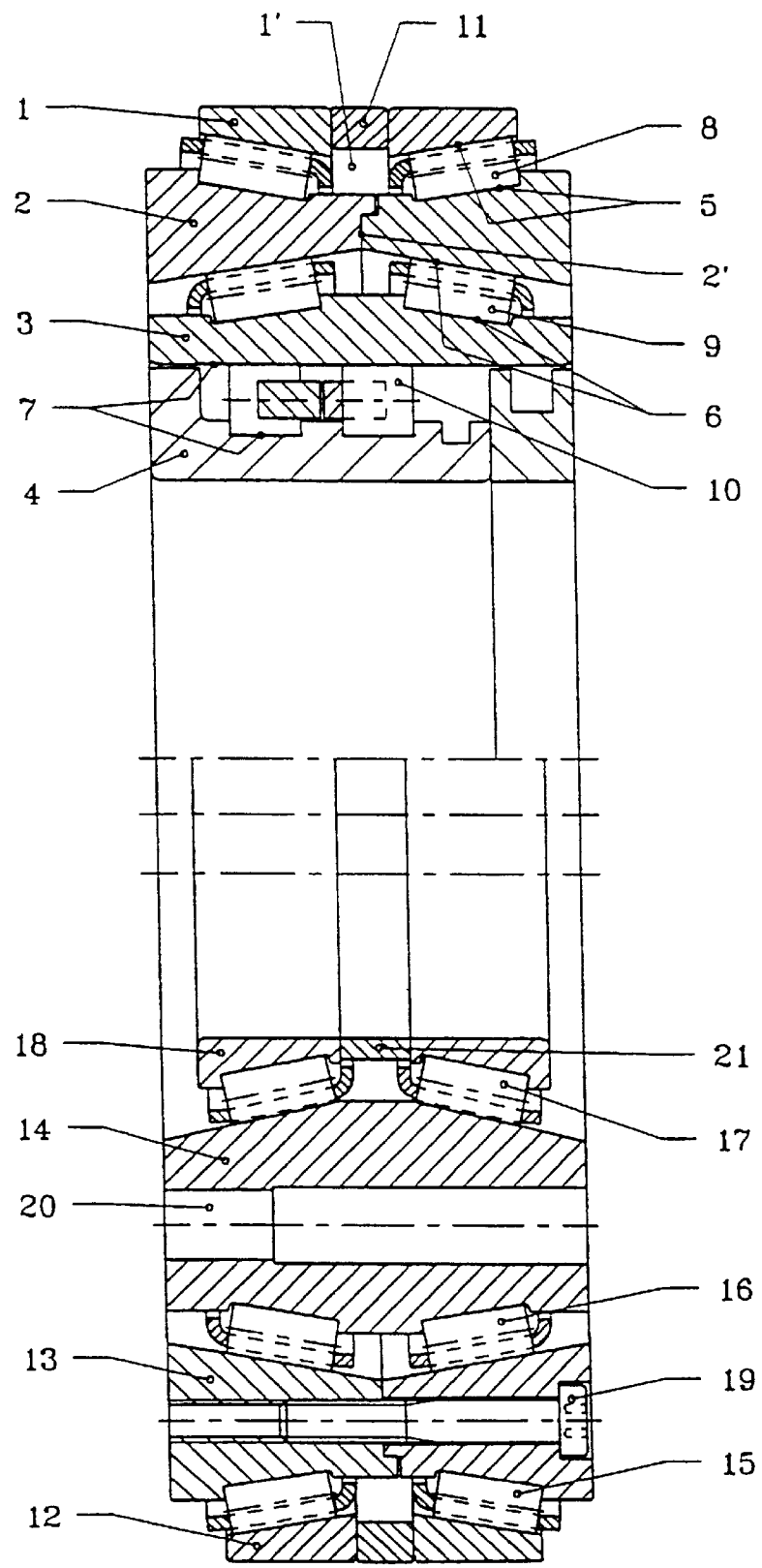

FOUR-RING ECCENTRIC BEARING FOR PRINTING-MACHINE CYLINDERS

BACKGROUND OF THE INVENTION

Four-ring eccentric bearings of this kind are known from DE-OS-14 00 319. There, relative motions are possible around and between two eccentric middle rings, which are desirable for installing and removing the cylinders, where the middle rings can be adjusted from the outside, e.g. by swivel arms. In this case, it is unfavorable that one bearing is constructed as a sliding bearing that must have a high radial play, which results in poor printing quality. Also, in the case a movable bearing is installed, it is inserted from the outside. This is associated with overcoming high friction, since during axial shifts of the outer box, which only swivels, in the case, which stays still, sliding occurs at a very low speed.

SUMMARY OF THE INVENTION

It is therefore the task of the invention to provide a four-ring eccentric bearing that does not have these disadvantages and that, in particular, permits a precise positioning of the rollers under favorable conditions of oscillation and rotation.

The solution of this task is to provide: a four-ring eccentric bearing which includes a two-double-ring ball bearings in an "X" or "O" arrangement radially on the outside of the movable bearing side; a double-row cylinder bearing or a needle bearing as an innermost bearing and three-double-ring ball bearings on the fixed bearing side in an "X" or "O" arrangement.

By having the two rows of bearings of the movable bearing each consist of two rows of ball bearings, which, moreover, only lead to oscillating motions, a pre-positioning of this bearing is possible, which leads to high precision in guiding. Since the inner row of bearings is constructed as a double-row cylindrical roller bearing or needle bearing, the result here in the case of an axial shift is a favorable movable-bearing effect. Specifically, the normal rotating motions occur here, so that the axial shift occurs when the cylinder is rolled off, which has the effect of very low friction.

At the fixed bearing, all three rows of bearings consist of double-row ball bearings, which makes possible a defined initial axial tension and thereby also an initial radial tension.

The initial tension desired in each case can be achieved most simply by providing an intermediate ring between the ring parts of the outer ring, which is in two parts, and by adapting the ring parts of the adjacent middle ring, which is also in two parts to each other by their inner end faces. Further, the setting of the initial tension is simplified by the inner double-row cylinder roller bearing being arranged opposite to the inner ring, which is in one part, and the inner ring, which is in two parts, being provided with an intermediate ring. In order that this initial tension cannot change later, the middle rings are in two parts with connecting screws arranged in axial holes thereof. The assembly personnel, who are often inexperienced, can then no longer change the resulting component, which is easily accessible. Other features and advantages of the present invention will become apparent from the following description of the invention which refers to the accompanying drawings.

The invention will be explained by means of the single drawing which shows a longitudinal section through a four-ring eccentric bearing illustrating certain principles of the invention, whereby the upper part is constructed as a movable bearing and the lower part as a fixed bearing.

DETAILED DESCRIPTION OF THE PREFERRED EMBODIMENT

Four-ring eccentric bearings are needed in providing bearings for installation and removal of printing-machine cylinders; and, as is known, they must consist of a movable and a fixed bearing for each cylinder. The movable bearing shown in the upper part of the drawing consists in this case of an outer ring 1, an outer middle ring 2, an inner middle ring 3, and an inner ring 4, whereby the middle rings 2 and 3 have running surfaces that are eccentric with respect to each other. The result in this case is three pairs of surfaces 5, 6, 7 that can rotate with respect to each other and stand a distance from each other, whereby this gap is filled with roller bearings 8, 9, 10. The outer series of roller bearings 8 consists of two ball rollers in an "O" arrangement, while the middle row of roller bearings 9 likewise comprises two rows of ball bearings, but in an "X" arrangement.

For reasons of assembly and installation, the outer ring 1 and the outer middle ring 2 are separated into two ring parts. An adjustable intermediate ring 11 is placed in the outer intermediate space 1'. With the separation line 2', the desired initial tension of the middle ball-bearing system can be set through the end-face loops. The inner middle ring 3 can be constructed as a unit. The position of the movable bearing is between the inner row of roller bodies 10, which consists of two rows of cylindrical rollers, and the edgeless inner track of the middle ring 3. Since the rotary motion of the roller also occurs here, the desired axial shift is easily possible in the movable bearings.

At surface pairs 5 and 6, however, no twist motions occur.

The fixed bearing is constructed similarly, as the lower part of the diagram shows. Rings 12, 13, and 14 and rows of rollers 15 and 16 in the form of double-row ball-bearings correspond to rings 1, 2, and 3 and rows of rollers 8 and 9, whereby only the inner middle ring 14 stands opposite a double-row ball-bearing 17. The inner ring 18 is again divided into two parts for reasons of assembly, and is adjusted by the intermediate ring 21.

A component with movable and fixed bearings results from having at least three axial connecting screws 19 provided in the thicker region of the middle rings 2 and 13. Attachment holes 20 in middle ring 14 or in middle rings 2, 3 and 13 (not shown) accept the devices for transmitting oscillations. Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A four-ring eccentric bearing for adjusting printing-machine rollers, including a movable side and a fixed side, comprising:

four rings, including an outer ring, an outer middle ring, an inner middle ring and an inner ring, at least the inner and outer middle rings having non-coaxial tracks;

three pairs of surfaces on the movable side, a first pair being between the outer ring and the outer middle ring, a second pair being between the outer middle ring and the inner middle ring and the third pair being between the inner middle ring and the inner ring;

fourth, fifth and sixth pairs of surfaces on the fixed side, the fourth pair of surfaces being between the outer ring and the outer middle ring, the fifth pair of surface being between the outer middle ring and the inner middle ring and the sixth pair of surfaces being between the inner middle ring; and respective roller bearings between the three pairs of surfaces so that the surfaces can rotate with respect to each other, the roller bearings between the first and second pairs of surfaces being respective double-ring ball-bearings in an "X" or "O" arrangement and the bearing between the third pair of surfaces being a double-row cylindrical roller bearing or a needle bearing; and three double-ring ball-bearings on the fixed-bearing side in an "X" or "O" arrangement between the fourth, fifth and sixth pairs of surfaces, respectively.

2. A four-ring eccentric bearing according to claim 1, wherein at the movable side, the outer ring and the outer middle ring are each in two parts, an intermediate ring is inserted between the parts of the outer ring, and the parts of the outer middle ring are adapted to each other by their inner end faces.

3. A four-ring eccentric bearing according to claim 1, wherein the inner middle ring is a one-part ring.

4. A four-ring eccentric bearing according to claim 1, wherein at the fixed bearing side, the outer ring and the outer middle ring are each in two parts, an intermediate ring is inserted between the two parts of the outer ring, and the parts of the outer middle ring are adapted by each other by their end surfaces.

5. A four-ring eccentric bearing according to claim 1, wherein the middle rings are each in two parts and have axial holes, and connecting screws are arranged in the axial holes.

* * * * *